US011409254B2

(12) United States Patent
Gravallese et al.

(10) Patent No.: US 11,409,254 B2
(45) Date of Patent: Aug. 9, 2022

(54) MANUFACTURING SYSTEM FOR BIOPHARMACEUTICAL PRODUCTS

(71) Applicant: GLOBAL LIFE SCIENCES SOLUTIONS USA LLC, Marlborough, MA (US)

(72) Inventors: Steve Robert Gravallese, Marlborough, MA (US); Jason Naylor, Pasching (AT); Edwin Brian Taylor, San Jose, CA (US); Sven Frie, Seoul (KR); Patrick McMahon, Marlborough, MA (US)

(73) Assignee: GLOBAL LIFE SCIENCES SOLUTIONS USA LLC, Marlborough, MA (US)

( * ) Notice: Subject to any disclaimer, the term of this patent is extended or adjusted under 35 U.S.C. 154(b) by 0 days.

(21) Appl. No.: 17/072,822

(22) Filed: Oct. 16, 2020

(65) Prior Publication Data
US 2021/0034028 A1 Feb. 4, 2021

Related U.S. Application Data

(63) Continuation of application No. 16/447,352, filed on Jun. 20, 2019, now Pat. No. 10,831,169, which is a continuation of application No. 15/249,982, filed on Aug. 29, 2016, now Pat. No. 10,372,100.

(51) Int. Cl.
*G06F 9/44* (2018.01)
*G06F 8/65* (2018.01)
(Continued)

(52) U.S. Cl.
CPC ....... *G05B 19/048* (2013.01); *G05B 19/4063* (2013.01); *G05B 19/4188* (2013.01);
(Continued)

(58) Field of Classification Search
CPC ............... H04L 67/12; H04L 67/1097; G05B 2219/32287; G05B 2219/31011;
(Continued)

(56) References Cited

U.S. PATENT DOCUMENTS 5,584,118 A 12/1996 Furukawa et al.
10,005,575 B2 * 6/2018 Cutting ................. B65B 31/04
(Continued)

FOREIGN PATENT DOCUMENTS

CN 1942840 4/2007
CN 101849237 9/2010
(Continued)

OTHER PUBLICATIONS

Corresponding Japanese Patent Application No. 2019-531540 Office Action dated Mar. 8, 2021.
(Continued)

*Primary Examiner* — Thuy Dao
(74) *Attorney, Agent, or Firm* — Grogan, Tuccillo & Vanderleeden, LLP

(57) ABSTRACT

The present disclosure relates to a manufacturing system, method and control circuitry for quality assured manufacturing of at least two biopharmaceutical products. The manufacturing system comprises a warehouse facility, a hydration facility, and at least two biopharmaceutical manufacturing facilities, wherein the warehouse facility and hydration facility are comprised in the macro structure. Each biopharmaceutical manufacturing facility is comprised in a respective micro node, and a control facility in the macro structure is configured to control interoperability of the macro structure and the micro nodes by means of a network spine interconnecting the macro structure with each micro node.

17 Claims, 5 Drawing Sheets

(51) Int. Cl.
*G06F 9/445* (2018.01)
*G05B 19/048* (2006.01)
*G05B 19/418* (2006.01)
*G05B 19/4063* (2006.01)

(52) U.S. Cl.
CPC ............ *G05B 19/41845* (2013.01); *G05B 2219/31011* (2013.01); *G05B 2219/31268* (2013.01); *G05B 2219/32368* (2013.01); *G05B 2219/32388* (2013.01); *G05B 2219/32393* (2013.01); *Y02P 90/02* (2015.11)

(58) Field of Classification Search
CPC ........... G05B 2219/31268; G05B 2219/32368; G05B 2219/32388; G05B 2219/32393; G05B 19/41865; G05B 19/048; G05B 19/4063; G05B 19/41845; G05B 19/4188; G06Q 10/087; G06Q 10/08; G06Q 30/0185; G06Q 30/3674; G16H 40/20; G16H 20/10; C08K 5/092; C08K 5/0025; Y02P 90/02; C09J 103/02; C09J 103/04
See application file for complete search history.

(56) References Cited

U.S. PATENT DOCUMENTS

| | | | |
|---|---|---|---|
| 2006/0100728 A1 | 5/2006 | Brown | |
| 2007/0192715 A1* | 8/2007 | Kataria | G16H 10/40 715/764 |
| 2013/0060712 A1* | 3/2013 | Esmaili | G06Q 10/08 705/341 |
| 2013/0167339 A1 | 7/2013 | Hara et al. | |
| 2013/0274929 A1* | 10/2013 | Hodge | G05B 15/02 700/277 |
| 2014/0012590 A1 | 1/2014 | Badger et al. | |
| 2014/0137978 A1* | 5/2014 | Dissanayake | B65B 3/003 141/1 |
| 2017/0247652 A1* | 8/2017 | Goluch | C12M 1/28 |

FOREIGN PATENT DOCUMENTS

| | | |
|---|---|---|
| CN | 102722105 | 10/2012 |
| CN | 102947202 | 2/2013 |
| JP | 2002518981 | 6/2002 |
| JP | 2012140204 A | 7/2012 |
| WO | 2011158308 A1 | 12/2011 |

OTHER PUBLICATIONS

Chinese Office Action dated Aug. 4, 2021 issued in corresponding Chinese Patent Application No. 201780052910.6.

Langer, Eric S.; Outsourcing media and buffer prep: facilities are evaluating ways to reduce bottlenecks, lower risks, eliminate logistics and inventory costs.(6 pgs.); Title Annotation: Bio Views; Published: Contract Pharma; Publication Date: Sep. 1, 2014.

* cited by examiner

MANUFACTURING SYSTEM FOR BIOPHARMACEUTICAL PRODUCTS

CROSS-REFERENCE TO RELATED APPLICATIONS

This application is a continuation of U.S. patent application Ser. No. 16/447,352, filed on Jun. 20, 2019, which is a continuation of U.S. patent application Ser. No. 15/249,982, filed on Aug. 29, 2016, now U.S. Pat. No. 10,372,100, issued on Aug. 6, 2019, the disclosure of which is hereby incorporated by reference in its entirety.

TECHNICAL FIELD

The present disclosure relates to a manufacturing system and method for quality assured manufacturing of biopharmaceutical products.

BACKGROUND ART

The development of novel biopharmaceutical compounds typically requires large investments in time and capital to translate scientific discovery into new medicine and to build specialized manufacturing facilities and equipment. Advanced technologies drive biopharmaceutical manufacturing that aligns with research and development, and requires considerable scientific know-how and infrastructure.

Over the past decade, improvements in biopharmaceutical manufacturing provide an ability to create and maintain market access through scalable and flexible operations, controlled costs, and high quality. In recent years the industry has increasingly turned its attention toward improvements in manufacturing technologies. Emerging technologies are generating further changes across the biopharmaceutical workforce and impacting manufacturers' collaboration strategies and their choices of facility locations.

The past decade has seen a significant shift in the nature of the products being manufactured and sold by the innovative biopharmaceutical industry. The global biopharmaceutical portfolio of today reflects a greater prevalence of large molecule drugs, expansion in the number of personalized or targeted products, and a rise of treatments for many orphan diseases. These development trends provide for biopharmaceutical products with extremely limited production runs, highly specific manufacturing requirements, and genotype-specific products. The on-going shift in the product mix provides a need for continuous improvement of the efficiency and effectiveness of production biopharmaceutical manufacturing.

Biologic medicines such as vaccines are complex molecules made by or from living cells and are often infused or injected. As such, they require highly specialized manufacturing, special storage and handling, and a tightly controlled, high quality manufacturing and distribution network to ensure safety and effectiveness. Developments are also observed with regard to orphan drugs, i.e., drugs aimed at diseases with patient populations of under 200,000, and there has been a steady increase over the past decade. Furthermore, manufacturers are increasingly focusing on more complex diseases for which there are few or no effective treatments. New treatments for these diseases are characterized by small volume products. Orphan drugs have created the need for manufacturing flexibility and the ability to use equipment, and supplies more efficiently and for more than one product because of their relatively small volumes. Additionally, orphan drugs have put pressure on manufacturing volume management, as production processes can often yield larger batches than the required volumes.

Another important trend within biopharmaceuticals is the emergence of personalized medicine; products that target a specific population of patients. Over time, as patient-level personalized medicines are introduced, manufacturing and product supply complexity will likely increase. Furthermore, manufacturing processes will need to accommodate small or scale batch specificity.

These drug portfolio trends have contributed to an increase in the number and complexity of products being manufactured and sold. They have resulted in greater product variety and increased occurrences of small-volume runs, which require frequent changeovers and may necessitate equipment reconfigurations and updates. Additionally, the new medicines have increased the need for more complex manufacturing processes, more advanced equipment, and cold chain or controlled storage. Overall, these drug portfolio trends indicate that there is a need for improved manufacturing creating flexibility with uncompromised quality, while creating operating efficiencies that can help reduce costs.

SUMMARY OF THE INVENTION

An object of the present disclosure is to provide solutions which seek to mitigate, alleviate, or eliminate one or more of the above-identified deficiencies in the art and to provide improved biopharmaceutical manufacturing.

This object is obtained by a manufacturing system for quality assured manufacturing of at least two biopharmaceutical products, the manufacturing system comprising a warehouse facility, a hydration facility, and at least two biopharmaceutical manufacturing facilities. The warehouse facility and hydration facility are comprised in a macro structure and each biopharmaceutical manufacturing facility is comprised in a respective micro node. A control facility in the macro structure is configured to control interoperability of the macro structure and the micro nodes by means of a network spine interconnecting the macro structure with each micro node.

The proposed manufacturing system provides for improved use of resources and reduced environmental impact for manufacturing of at least two biopharmaceutical products, e.g., biopharmaceutical drugs, whilst maintaining quality assurance and independence in each manufacturing process.

According to an aspect of the disclosure, the macro structure and each micro node respectively each comprise a communication interface to the network spine.

According to an aspect of the disclosure, each micro node, which is supported by the macro structure by means of the network spine, is self-sufficient and independent of the other micro nodes.

According to a further aspect of the disclosure, each micro node is inter-operationally discrete from the other micro nodes.

Advantages of setting up a manufacturing system with self-sufficient, independent and inter-operationally discrete micro nodes communicatively connected to a macro structure comprises improved security, scalability, reduced environmental impact and energy requirements. Other benefits are lowered capital and operating costs as well as enhanced quality.

The object of the disclosure is also obtained by a method for quality assured manufacturing of at least two biopharmaceutical products in a manufacturing system, the manufacturing system comprising a macro structure, at least two micro nodes and a network spine interconnecting the macro structure with each micro node. The macro structure comprises a warehouse facility and a hydration facility. The at least two micro nodes representing inter-operationally discrete biopharmaceutical manufacturing facilities, wherein a control facility in the macro structure is configured to control interoperability of the macro structure and the micro nodes by means of the network spine. The method comprises to obtain, in the respective micro nodes, supply materials comprising customized culture media in single-use equipment from the macro structure by means of the network spine. The supply materials to produce respective biopharmaceutical products are processed in respective micro nodes.

The object of the disclosure is also obtained by a computer program product comprising at least one non-transitory computer readable storage medium having computer-executable program code instructions stored therein. The computer-executable program code instructions comprise program code instructions configured, when executed in a control facility of a macro structure, to receive, from a micro node, a communication comprising an order for supply materials, wherein the customized supply materials comprise customized culture media. The computer-executable program code instructions further comprise program code instructions configure to, when executed in a control facility of a macro structure, prepare the customized culture media and send the customized culture media in single-use equipment from the macro structure to the micro node by means of a network spine interconnecting the macro structure with the micro node.

In addition to the advantages mentioned above, which of course also are applicable to the method and computer program product embodiments, the disclosure provides the advantage of improved process robustness and the possibility for accelerated scale-up to commercial production of biopharmaceutical products. Further advantages include increased flexibility and reduced production lead times.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Various embodiments of the present invention now will be described more fully hereinafter with reference to the accompanying drawings, in which some, but not all embodiments of the invention are shown. The invention may be embodied in many different forms and should not be construed as limited to the embodiments set forth herein; rather, these embodiments are provided so that this disclosure will satisfy applicable legal requirements. Advantages and features of the present disclosure and methods to achieve them will become apparent from the below description of exemplary embodiments. However, the present disclosure is not limited to the exemplary embodiments disclosed herein but may be implemented in various different ways. The exemplary embodiments are provided for making the disclosure of the present disclosure thorough and for fully conveying the scope of the present disclosure to those skilled in the art. It is to be noted that the scope of the present disclosure is defined solely by the claims.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

It should be noted that the word "comprising" does not necessarily exclude the presence of other elements or steps than those listed. It should further be noted that any reference signs do not limit the scope of the claims, that the example embodiments may be implemented at least in part by means of both hardware and software.

The various example embodiments described herein are described in the general context of method steps or processes, which may be implemented in one aspect by a computer program product, embodied in a computer-readable medium, including computer-executable instructions, such as program code, executed by computers in networked environments.

Detailed descriptions of well-known functions and structures incorporated herein will be omitted to avoid obscuring the subject matter of the present disclosure. Further, terms or words used in the specification and claims shall not be construed merely in a conventional and dictionary definition but shall be construed in a meaning and concept corresponding to the technical idea of the present invention.

Figure 1:
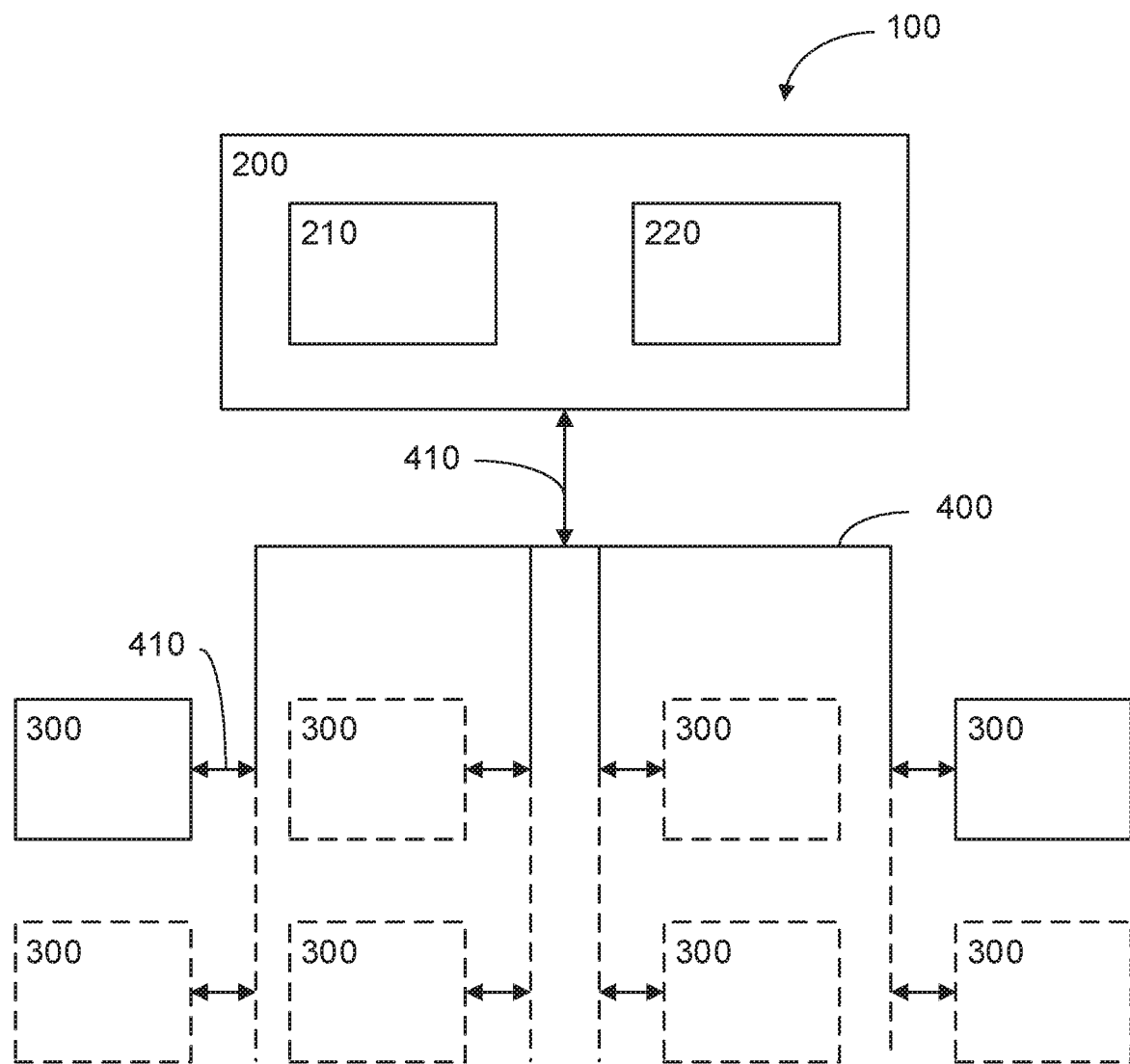
FIGS. 1-2 are block diagrams of a manufacturing system according to various embodiments of the present disclosure.

FIG. 1 illustrates an example embodiment of a system architecture that may be used in conjunction with various embodiments of the present invention for quality assured manufacturing of at least two biopharmaceutical products. The embodiment illustrated in FIG. 1 comprises a warehouse facility 210, a hydration facility 220 and at least two biopharmaceutical manufacturing facilities. The warehouse facility 210 and the hydration facility 220 are comprised in a macro structure 200, whereas each manufacturing facility is comprised in a respective micro node 300. A control facility in the macro structure 200 is configured to control interoperability of the macro structure 200 and the micro nodes 300 by means of a network spine 400 interconnecting the macro structure 200 with each micro node 300.

Figure 2:
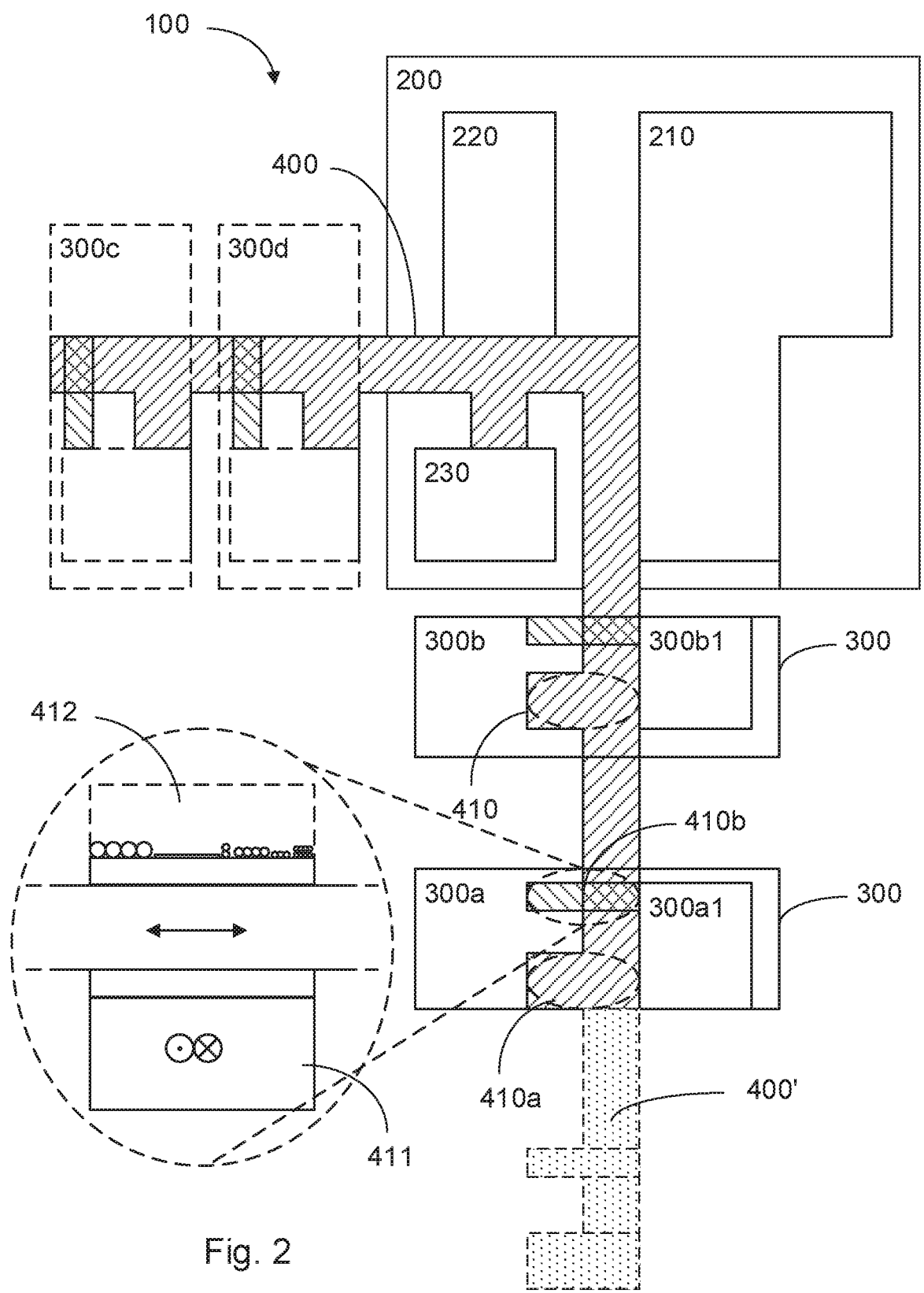

FIG. 2 illustrates a further example embodiment of a system architecture that may be used in conjunction with various embodiments of the present invention for quality assured manufacturing of at least two biopharmaceutical products. A manufacturing system 100 for quality assured manufacturing of at least two biopharmaceutical products is disclosed. The manufacturing system 100 comprises a warehouse facility 210, a hydration facility 220, and at least two biopharmaceutical manufacturing facilities. The macro structure 200 comprises the warehouse facility 210 and the hydration facility 220 and a control facility 230. The two biopharmaceutical manufacturing facilities are comprised in a respective micro node 300. The control facility 230 of the macro structure 200 is configured to control interoperability of the macro structure 200 and the micro nodes 300 by means of a network spine 400 interconnecting the macro structure 200 with each micro node 300.

The macro structure 200 may be operated by the facility provider on behalf of a biopharmaceutical manufacturer residing in one or more of the micro nodes 300, but the macro structure 200 may also be operated by and/or on behalf of a facility provider that has no direct involvement in the biopharmaceutical manufacturing taking place in the micro nodes 300.

As mentioned, the macro structure 200 comprises a warehouse facility 210, a hydration facility 220 and a control facility 230. According to an aspect of the disclosure, the warehouse facility 210 may include segregated areas for each biopharmaceutical manufacturer, wherein the supply material may be stored as well as the final product ready for delivery. The macro structure 200 may also be configured for utility supplies and waste treatment, e.g., power, gas, water and effluents.

The network spine 400 interconnects the macro structure 200 and each individual micro node 300. Thus, the manufacturing system 100 is configured with a spine approach with micro nodes 300 comprising biopharmaceutical manufacturing capability connected to the spine as well as support facilities forming part of the macro structure 200. According to aspects of the disclosure, the macro structure 200 and each micro node 300 comprises a communication interface 410 to the network spine 400. The micro nodes 300 may be arranged on one side of the network spine 400, while the support facilities are arranged on the other side.

The above disclosed manufacturing system 100 may also be presented at a biopharmaceutical site, comprising biopharmaceutical manufacturing facilities and support utilities interconnected so that the manufacturing performed in the respective manufacturing facilities is separated from one another. According to aspects of the disclosure, each micro node 300 is self-sufficient and independent of the other micro nodes 300. Furthermore, each micro node 300 is inter-operationally discrete from the other micro nodes 300. Each micro node 300 may comprise independent IT systems/ server rooms and independent phone systems. Furthermore, access control will be segregated per micro node 300. Each micro node 300 may comprise an independent security system.

As disclosed in FIG. 2, the manufacturing system 100 may initially be set up with two micro nodes 300a, 300b that will be operational immediately, while the micro nodes 300c, 300d are ready to bring into operation or projected to be brought into operation at a future date. As indicated in FIG. 2, preparations may also have been made for extending the network spine with a future extension or sub-spine 400' to allow add-on of further micro-nodes that may not yet have been projected. As will be obvious to the person skilled in the art, such sub-spines may extend in directions orthogonal or at other angles to the established network spine. The micro nodes 300a, 300b comprise respective biopharmaceutical manufacturing facilities, including office facilities and laboratories dedicated for the specific biopharmaceutical production of the micro node.

Turning back to the macro structure 200, a warehouse facility 210, a hydration facility 220 and a control facility is comprised in the structure. The macro structure 200 may also be configured to provide security operation common throughout the site, provided by a site manager or by an independent company. Likewise, parts of an IT infrastructure may be common within the site, while other parts remain under the sole control of a micro node operator.

Access control will be segregated per micro node 300, but will of course also be provided with regard to access to the macro structure 200. According to aspects of the disclosure, access control will be provided in the communications interface to the network spine 400, i.e., in the communications interface 410 between each micro node 300 and the network spine 400, e.g., for a materials air lock that may represent a materials delivery interface 412 between the respective micro nodes 300 and the network spine 400. Transporting of materials to/from the micro nodes 300 over the network spine 400, may be fully automated using unmanned transport equipment or vehicles to transport materials between the warehouse facility 210 or hydration facility 220 and the manufacturing facility. Common emergency systems will also be provided in the macro structure 200, as well as micro node 300 implemented emergency systems. These emergency systems provide fulfillment of at least minimum safety requirements throughout the whole system. Things to be considered include but are not limited to:

easy accessibility of safety showers and eyewash stations in all production areas, laboratories, material handling areas, mechanical areas and waste storage areas. iii. Fire extinguishers, first aid cabinets, door release mechanisms, etc.;

spill containment for flammables/chemical handling areas;

fire rated areas, with correct egress, sprinkler coverage, and ventilation; and electrical design per the requirements of the electrical classification for each area of the site, including the flammables/chemical handling areas.

A common warehouse facility 210 belongs to the key aspects of the macro structure 200. In the warehouse, segregation may be maintained between warehouse materials of the biopharmaceutical manufacturer residing in the micro nodes 300 and a common warehouse area. However, even with such segregation, access to the warehouse facility 210 may be restricted for operators of the micro nodes 300, and transportation of materials between a micro node 300 and the warehouse is arranged through the network spine 400. Such material includes finished products, interim products and raw materials. Storage of raw materials is carried out in the warehouse where the material may be stored at the appropriate temperature, e.g., ambient, 2-8.degree. C., or −20.degree. C. The storage may be performed segregated per micro node. This may also apply to cell banking required for all the biopharmaceutical manufacturers residing in the micro nodes 300, however cell banking may also be done in laboratories set up in the respective micro nodes and from security and cross-contamination aspects there are benefits in only having the cell banking in the respective micro nodes. Hazardous materials may also be separated and stored in a different location within the warehouse. Materials that are released or unreleased may be stored alongside each other as the inventory management system identifies locations of all raw materials. Raw Material sampling may occur in a raw material sampling area directly adjacent to the warehouse. For an initial manufacturing system 100 set up with two micro nodes 300a, 300b, warehouse areas for these micro node operators may be outfitted or operational at project start-up. Warehouse areas for further micro nodes 300 to be interconnected to the macro structure 200 at a later occasion will be built but not outfitted. These warehouse areas will only be outfitted or operational when further micro nodes 300c-d are contracted. The warehouse facility 210 will comprise receiving docks arranged to receive material delivered from external source. A materials delivery interface may also be provided to the network spine 400 interconnecting the macro structure 200 with the respective micro nodes 300. The receiving docks may be arranged adjacent to warehouse and storage to provide an easy flow for materials from the receiving docks into the warehouse a hazardous storage area, quarantine area and raw material sampling lab.

The hydration facility 220 is a key facility of the macro structure 200. The hydration facility 220 should be dimensioned to support at least a plurality of micro nodes 300. It may further be capable of supporting external facilities. While the hydration facility 220 is dimensioned to support a pre-determined number of micro nodes 300, there is of course no need for all micro nodes 300 to be introduced in the manufacturing system 100 at the time of initiating operation in the system. One or more micro nodes 300 may easily be retro-fitted to the manufacturing system 100 using pre-determined connection points to the network spine 400. According to an aspect of the disclosure, the hydration facility 220 is configured to receive culture media and buffer material in a powder or concentrate form and to hydrate such material in the hydration facility 220. Whilst belonging to the macro structure 200, the hydration facility 220 is connected to the network spine 400 to allow transportation of material to/from the micro nodes 300. According to aspects of the disclosure, the hydration facility 220 will be operated by personnel separate from that of the micro nodes 300 and the biopharmaceutical manufacturing facilities of the micro nodes 300 may receive materials from the hydration facility 220 in single-use containers or other equipment or mechanisms. According to aspects of the disclosure, the hydration facility 220 comprises at least one water for injection system, WFI, a process water system, PW, process gases and a neutralization system. The hydration facility may also comprise an autoclave facility and/or a glass washer as optional features. Utilities to support the hydration process include chilled water, plant steam, and electricity. The hydration facility 220 may further include tugs or vehicles for automatically and/or manually moving material into the micro nodes 300 or warehouse facility 210 by means of the network spine 400.

Figure 5:
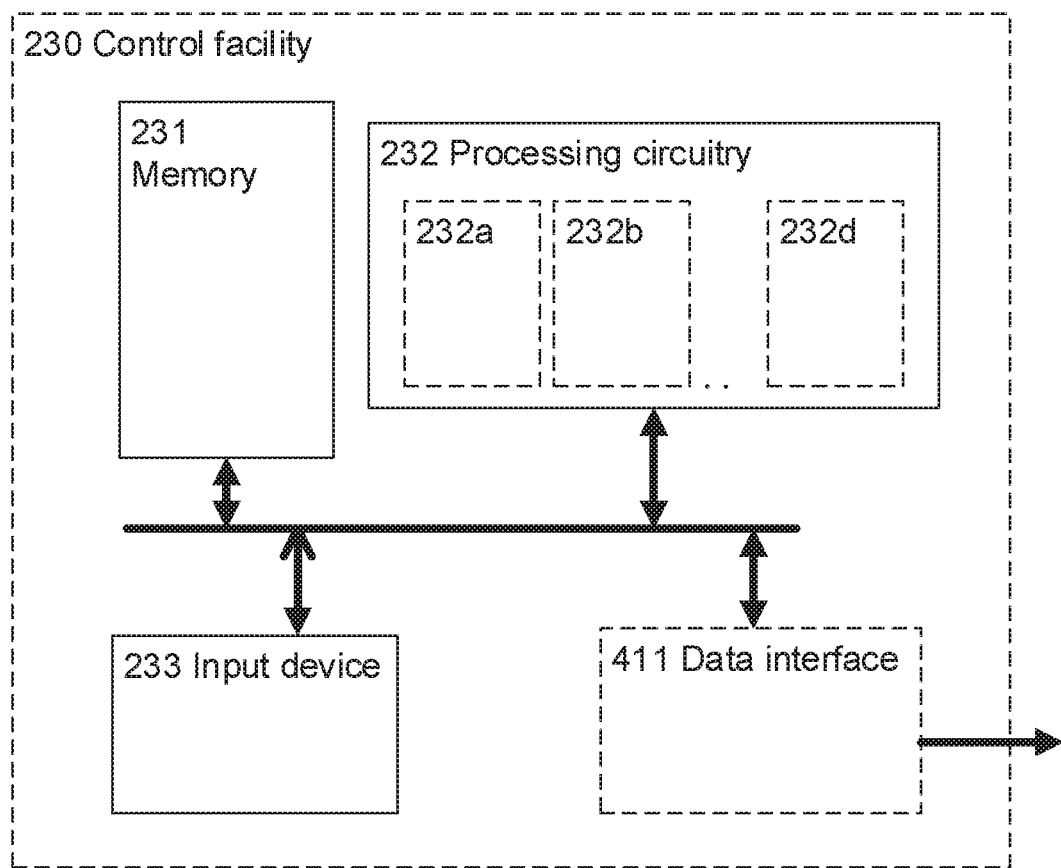
FIG. 5 is a block diagram illustration of a macro structure control facility.

A control facility 230 is configured to control interoperability of the macro structure 200 and the micro nodes 300 by means of a network spine 400 interconnecting the macro structure 200 with each micro node 300. FIG. 5 discloses an embodiment of the control facility which will be further described below.

In addition to the above disclosed warehouse facility 210 and hydration facility 220, the macro structure 200 may also provide utilities to the manufacturing system 100. Such utilities may be provided to the micro nodes 300 by means of the network spine 400.

According to another aspect of the disclosure, the macro structure 200 may comprise administrative facilities and support facilities such as laboratories, e.g., quality control laboratories. The research facilities could be segregated per micro node 300 operator, but still provided as a common good belonging to the macro structure 200.

Other facilities foreseen as part of the macro structure 200 are cafeteria areas, training areas, meeting rooms and parking spaces. Accordingly, the proposed manufacturing system 100 provides a cost effective solution for manufacturing a plurality of biopharmaceutical products while maintaining full control of process separation and all quality requirements.

Turning to the micro nodes, FIG. 2 discloses an example scenario wherein the manufacturing system 100 is brought into operation with two micro nodes 300*a*, 300*b*. A third and fourth micro node 300*c* and 300*d* are prepared to be brought into operation, while further micro nodes (not shown) may be installed at a later time, retrofitted to the manufacturing system 100. The biopharmaceutical manufacturing may be configured for at least biosafety level 1, BSL-1 criteria and production requirements wherein harvest occurs every 3-4 days.

Each micro node 300 comprises biopharmaceutical manufacturing facilities and may be managed separately by respective operators. According to aspects of the disclosure, each micro node 300 is supported by the macro structure 200 by means of the network spine 400 and is self-sufficient and independent of the other micro nodes. The micro node may also be inter-operationally discrete from the other micro nodes. Considering one micro node 300*a* of FIG. 2, the micro node is interconnected to the macro structure by means of the network spine 400. A communication interface 410 may provide inter-connectivity between the micro node 300*a* and the network spine 400. The communications interface may comprise a data interface 411 and/or a materials delivery interface 412, e.g., a materials air lock. According to an aspect of the disclosure, the micro node 300*a* also comprises a control unit 300*a*1, independent of the control facility within the macro structure. The control unit of the micro node provides control of operations within the micro node. A further communications interface, controlled by the control unit 300*a*1, is arranged to enable communication between the micro node 300*a* and a public area. Such communication may involve entering of human resources, employees, to the micro node 300*a* from a public area, but also data traffic to/from the micro node 300*a* and an external network.

Figure 3:
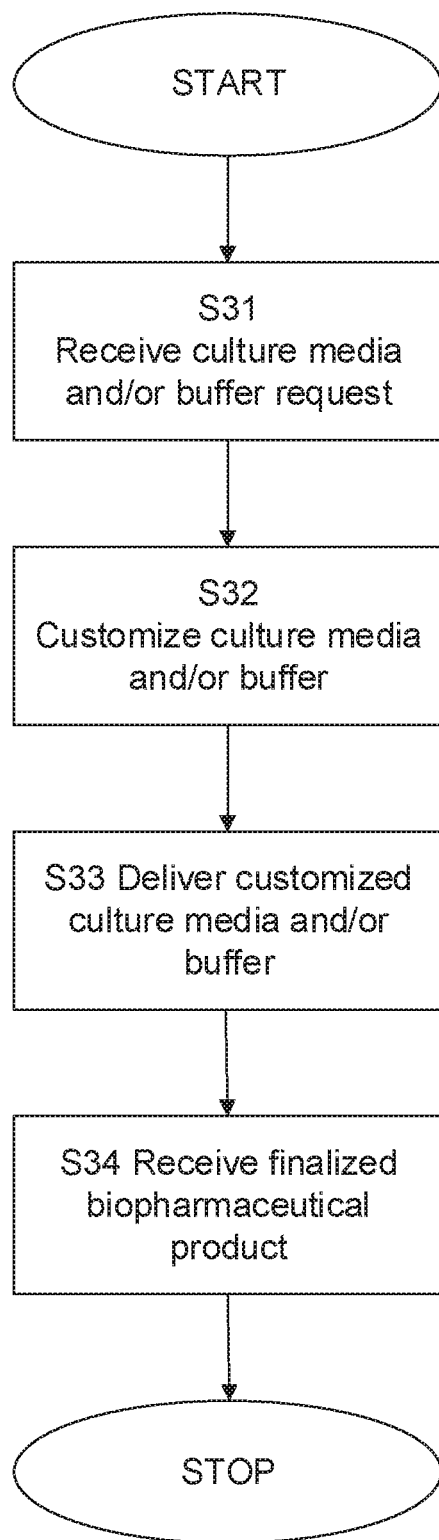
FIGS. 3 and 4 each provide a flowchart illustrating various processes and procedures that may be completed in accordance with various embodiments of the present invention.

FIG. 3 is a flowchart illustrating various processes and procedures that may be completed in a macro structure in a manufacturing system according to embodiments of the present invention. The macro structure receives S31, in the control facility of the macro structure, a request for customized culture media and/or buffer. The request is processed within the control facility and submitted in an order to the hydration facility, e.g., in an automated manner. In the hydration facility, the culture media and/or buffer is customized S32 according to the received order from the control facility. When the customization procedure has been concluded, delivery S33 of the customized culture media and/or buffer to the micro node is initiated in response to an order from the control facility. Delivery takes place by means of the network spine, and may be performed in single-use equipment, e.g., by automated guided vehicles in a fully automated manner.

Figure 4:
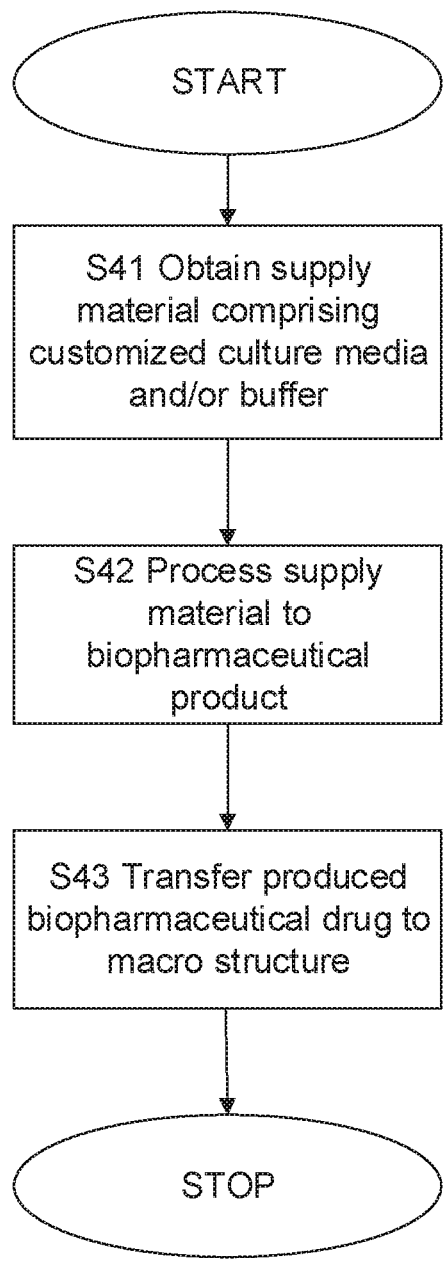

Turning to FIG. 4, a flowchart illustrating various processes and procedures that may be completed in a micro node in a manufacturing system according to embodiments of the present invention is illustrated. The micro node obtains S41 supply material comprising customized culture media. The supply material is processed S42 to produce respective biopharmaceutical products. Arriving at a quality assured biopharmaceutical product, the micro node initiates transfer S43 of the biopharmaceutical drug to the macro structure, i.e., to the warehouse facility 210 for storage or delivery to an end user distributor. As disclosed in FIG. 3, the macro structure, receives S34 one or more finalized biopharmaceutical products from the respective micro nodes, where physical receipt of the product follows upon receipt of a pick-up request sent to the control facility 230 of the macro structure 200. The control facility receiving the pick-up request, makes arrangements for such pick-up using the network spine for delivery of the biopharmaceutical product from a network spine to the receiving warehouse facility 210, e.g., by using automated guided vehicles in the network spine. Manual delivery may also be used since the final product may only consist of a small amount.

FIG. 5 shows a schematic diagram of an example control facility 230 of the macro structure 200. The control facility 230 is configured to control interoperability of the macro structure 200 and the micro nodes 300 by means of a network spine 400 interconnecting the macro structure 200 with each micro node 300. The control facility comprises a memory 231, processing circuitry 232, and input device 233. The control facility may also comprise a data interface 411 providing data connectivity with the network spine 400. As disclosed in FIG. 5, the processing circuitry may comprise micro node dedicated partitions 232a-232d.

In general, the term processing circuitry may refer to, for example, one or more computers, computing entities, distributed systems, processing devices, processing entities, and/or any combination of devices or entities adapted to perform the functions, operations, and/or processes described herein. Such functions, operations, and/or processes may include, for example, transmitting, receiving, operating on, processing, storing, creating/generating, and/or similar terms used herein.

The control facility 230 is configured to execute a computer program product comprising at least one non-transitory computer readable storage medium having computer-executable program code instructions store therein. When executing the program code instructions in the processing circuitry 232, the macro structure 200 is configured to control interconnectivity between the macro structure 200 and the micro nodes 300 over the network spine 400 as discussed above. The control facility is configured to receive a request for customized culture media and to control customization of the culture media in the hydration facility. When the customization procedure has been concluded, the control facility initiates delivery of the customized culture media to the micro node Delivery takes place by means of the network spine, and may be performed in single-use equipment, e.g., by automated guided vehicles in a fully automated manner. Following manufacturing of the biopharmaceutical product in the micro node, the control facility may receive a pick-up request. Arrangements are made for such pick-up using the network spine for delivery of the biopharmaceutical product from a network spine to the receiving warehouse facility, e.g., by using automated guided vehicles in the network spine.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated.

In the drawings and detailed description, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

What is claimed is:

1. A manufacturing system comprising:
a network spine configured for connection to a biopharmaceutical manufacturing facility via a communication interface;
a warehouse facility for the storage of biomaterials, the warehouse facility connected to the network spine;
a control facility connected to the network spine;
wherein the control facility is operative to receive a biomaterials order from a biopharmaceutical manufacturing facility through the communication interface, to confirm receipt of the biomaterials order, via the control facility, to the biopharmaceutical manufacturing facility prior to delivery of the selected biomaterials, and to return a biomaterials delivery from the warehouse facility to the biopharmaceutical manufacturing facility through the communication interface in response to a received biomaterials order.

2. The manufacturing system of claim 1 wherein the communication interface comprises:
a data interface operative to transmit biomaterials orders from the biopharmaceutical manufacturing facility to the control facility; and
a material delivery interface operative to receive a biomaterials delivery from the warehouse facility.

3. The manufacturing system of claim 2 wherein the material delivery interface is an airlock.

4. The manufacturing system of claim 1 further comprising:
a hydration facility connected to the network spine, the hydration facility configured to hydrate biomaterials in powdered or concentrated form prior to delivery to a biopharmaceutical manufacturing facility.

5. The manufacturing system of claim 1 further comprising:
a first biopharmaceutical manufacturing facility operatively connected to the network spine via a first communication interface.

6. The manufacturing system of claim 5 further comprising:
a second biopharmaceutical manufacturing facility operatively connected to the network spine via a second communication interface.

7. The manufacturing system of claim 6 wherein each biopharmaceutical manufacturing facility includes a stand-alone controller.

8. The manufacturing system of claim 6 wherein each biopharmaceutical manufacturing facility is self-sufficient and independent of the other biopharmaceutical manufacturing facility.

9. The manufacturing system of claim 6 wherein the network spine is preconfigured for retrofit connection of one or more additional biopharmaceutical manufacturing facilities.

10. The manufacturing system of claim 1 wherein the biomaterials include customized culture media and/or buffer.

11. A method for manufacturing a biopharmaceutical product via a manufacturing system having a controller, at least one biopharmaceutical manufacturing facility, a warehouse facility, and a network spine operatively connected to the controller, manufacturing facility and warehouse facility, the method comprising:
- receiving, in the controller, a biomaterials order from a biopharmaceutical manufacturing facility;
- confirming receipt of the biomaterials order, via the controller, to the biopharmaceutical manufacturing facility through the network spine;
- selecting biomaterials responsive to the biomaterials order from within the warehouse facility; and
- delivering the selected biomaterials to the biopharmaceutical manufacturing facility through the network spine.

12. The method of claim 11 further comprising:
- manufacturing a biopharmaceutical product in the biopharmaceutical manufacturing facility utilizing the selected biomaterials; and
- delivering the biopharmaceutical product to the warehouse facility via the network spine.

13. The method of claim 11 further comprising:
- hydrating the selected biomaterials in a hydration facility operatively connected to the manufacturing system prior to delivery of the biomaterials to the biopharmaceutical manufacturing facility.

14. The method of claim 11 further comprising:
- customizing the selected biomaterials prior to delivery of the biomaterials to the biopharmaceutical manufacturing facility.

15. A controller for a biopharmaceutical manufacturing system, the controller configured to execute at least one non-transitory computer readable storage medium, the system having at least one biopharmaceutical manufacturing facility, a macro structure, and a network spine operatively connected to the controller, manufacturing facility, and macro structure, the controller configured to:
- receive, from a biopharmaceutical manufacturing facility, a request for culture media stored in the macro structure;
- confirm receipt of the request to the biopharmaceutical manufacturing facility prior to preparation and delivery of the culture media;
- control, in the macro structure, preparation of the culture media; and
- deliver the culture media to the biopharmaceutical manufacturing facility from the macro structure via the network spine.

16. The controller of claim 15 further configured to:
- verify the culture media request prior to preparation of the culture media.

17. The controller of claim 15 further configured to:
- receive at the macro structure a request from the biopharmaceutical manufacturing facility to pick up a finished biopharmaceutical product; and
- coordinate pickup of the finished biopharmaceutical product from the manufacturing facility.

* * * * *